(12) United States Patent  
Miyashiro et al.

(10) Patent No.: US 10,391,584 B2  
(45) Date of Patent: Aug. 27, 2019

(54) ULTRASONIC BONDING JIG, ULTRASONIC BONDING METHOD, AND BONDING STRUCTURE

(71) Applicant: NIPPON MEKTRON, LTD., Tokyo (JP)

(72) Inventors: Hiroshi Miyashiro, Tokyo (JP); Yoichi Suruga, Tokyo (JP); Shuhei Koyano, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 0 days.

(21) Appl. No.: 15/933,438

(22) Filed: Mar. 23, 2018

(65) Prior Publication Data

US 2019/0047079 A1    Feb. 14, 2019

(30) Foreign Application Priority Data

Aug. 8, 2017  (JP) .................................. 2017-153391

(51) Int. Cl.
| | |
|---|---|
| *B23K 20/00* | (2006.01) |
| *B23K 20/10* | (2006.01) |
| *F16B 5/00* | (2006.01) |
| *F16B 5/08* | (2006.01) |

(52) U.S. Cl.
CPC ............ *B23K 20/10* (2013.01); *F16B 5/0096* (2013.01); *F16B 5/08* (2013.01)

(58) Field of Classification Search
CPC .............................. B23K 20/106; B23K 20/10
See application file for complete search history.

(56) References Cited

U.S. PATENT DOCUMENTS

| | | | |
|---|---|---|---|
| 2012/0125520 A1* | 5/2012 | Yoshida ............... | B23K 20/106 156/64 |
| 2013/0119111 A1* | 5/2013 | Delsman .............. | B23K 20/007 228/1.1 |

FOREIGN PATENT DOCUMENTS

WO       2013/105361 A1     7/2013

* cited by examiner

*Primary Examiner* — Erin B Saad  
(74) *Attorney, Agent, or Firm* — Studebaker & Brackett PC

(57) ABSTRACT

An ultrasonic bonding jig includes: a plurality of protrusions; and a planar portion among protrusions formed among base ends of the protrusions. The protrusions have side surfaces of tapered surfaces, the side surfaces being positioned in a vibration direction. At the tapered surfaces, an inclination of a tangent at distal ends of the protrusions, with respect to the vibration direction, is larger than an inclination of a tangent at the base ends of the protrusions, with respect to the vibration direction.

3 Claims, 10 Drawing Sheets

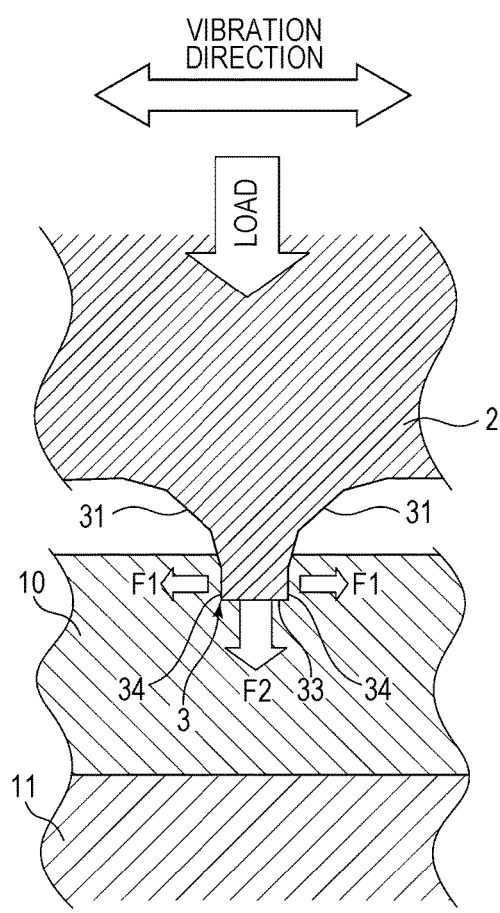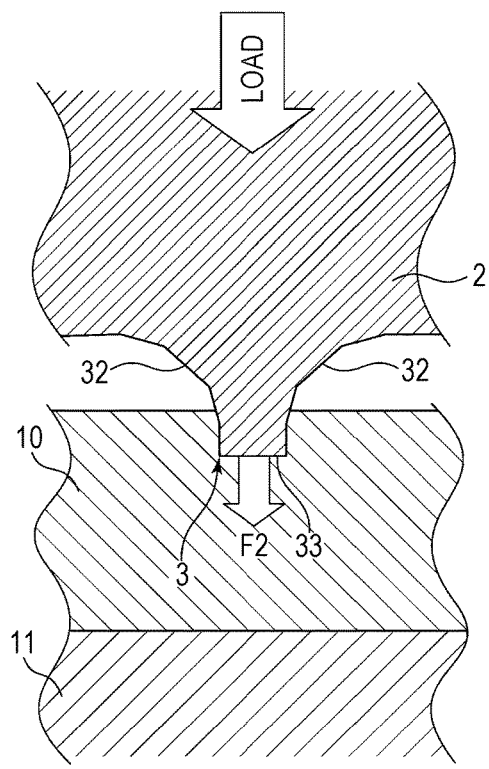

ULTRASONIC BONDING JIG, ULTRASONIC BONDING METHOD, AND BONDING STRUCTURE

CROSS-REFERENCE TO RELATED APPLICATION

This application claims priority from Japanese Patent Application No. 2017-153391 filed with the Japan Patent Office on Aug. 8, 2017, the entire content of which is hereby incorporated by reference.

BACKGROUND

1. Technical Field

The present disclosure relates to an ultrasonic bonding jig, an ultrasonic bonding method, and a bonding structure.

2. Description of the Related Art

In ultrasonic bonding, a metal plate and a metallic base material are stacked and placed on a support table. In this state, while the metal plate is pressed by an ultrasonic bonding jig, ultrasonic vibration is performed on the ultrasonic bonding jig at a predetermined frequency in a horizontal direction. Thus, pressing force and the ultrasonic vibration from the ultrasonic bonding jig act on opposed surfaces of the metal plate and the base material. Consequently, an oxide and other dirt on surfaces of the metals are removed. Furthermore, friction heating generated by the pressing force and the ultrasonic vibration generates bonding between metal atoms.

A chip (an ultrasonic bonding jig) disclosed in WO 2013/105361 A (the ninth page, the second drawing) includes a plurality of protrusions arranged in a grid pattern on a processed surface abutting on an electrode laminated body (a metal plate). Chamfers are provided on a contour line of the protrusions disposed on an outermost periphery among the plurality of protrusions such that the protrusions have an arc having a radius R meeting R≥A/6 when an external dimension in the one direction is defined as A. This restrains a break of the electrode laminated body caused by ultrasonic bonding.

SUMMARY

An ultrasonic bonding jig includes: a plurality of protrusions; and a planar portion among protrusions formed among base ends of the protrusions. The protrusions have side surfaces of tapered surfaces, the side surfaces being positioned in a vibration direction. At the tapered surfaces, an inclination of a tangent at distal ends of the protrusions, with respect to the vibration direction, is larger than an inclination of a tangent at the base ends of the protrusions, with respect to the vibration direction.

BRIEF DESCRIPTION OF THE DRAWINGS

FIG. 5A is a front cross-sectional view illustrating a state where a metal foil is pressed by the head while the protrusions are vibrated for the ultrasonic bonding of the metal foil with a busbar, and FIG. 5B is similarly a cross-sectional side view;

DESCRIPTION OF THE EMBODIMENTS

Figure 1:
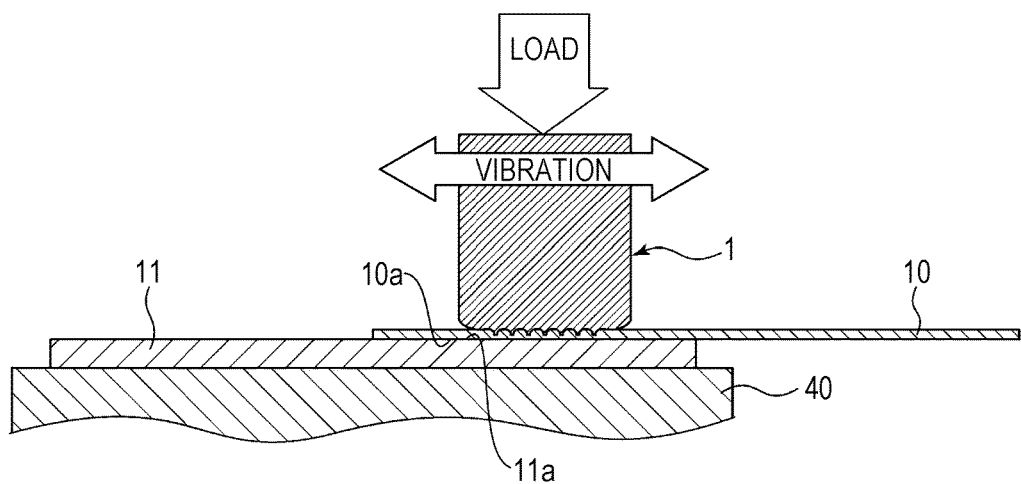
FIG. 1 illustrates a principle of ultrasonic bonding according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A technique in WO 2013/105361 A performs ultrasonic vibration where distal end portions of protrusions bite into an electrode laminated body while the electrode laminated body is pressed by the plurality of protrusions on a processed surface of a chip. Therefore, when the protrusions vibrate relative to the electrode laminated body, a force acting from side surfaces on both sides of the protrusions in the vibration direction caused by the vibration presses up an electrode laminated body component (a metal plate component). Hence, a force by the vibration acting on opposed surfaces of the electrode laminated body and a base material decreases. Consequently, bonding strength of the electrode laminated body with the base material lowers especially in the case of the electrode laminated body being a thin film.

One object of the present disclosure is to provide an ultrasonic bonding jig and an ultrasonic bonding method that can maintain a force caused by vibration acting on opposed surfaces of a metal plate and a metallic base material large and a bonding structure with a high bonding strength.

An ultrasonic bonding jig according to one aspect of the present disclosure (the present ultrasonic bonding jig) includes: a plurality of protrusions; and a planar portion among protrusions formed among base ends of the protrusions, wherein the protrusions have side surfaces of tapered surfaces, the side surfaces being positioned in a vibration direction, and at the tapered surfaces, an inclination of a tangent at distal ends of the protrusions, with respect to the vibration direction, is larger than an inclination of a tangent at the base ends of the protrusions, with respect to the vibration direction.

In this bonding jig, the side surfaces positioned in the vibration direction of the protrusions have the tapered surfaces. At this tapered surface, the inclination of the tangent with respect to the vibration direction of the protrusions is large at the distal end of the protrusion. Therefore, while the distal ends of the protrusions bite into the metal plate, an amount that the distal end sides of the side surfaces positioned in the vibration direction of the protrusions press up the components of the metal plate can be reduced. Furthermore, at this tapered surface, the inclination of the tangent with respect to the vibration direction of the protrusions is small at the base end of the protrusion. Hence, the base end sides of the side surfaces positioned in the vibration direction of the protrusions press down the components of the metal plate to press and expand the components. Accordingly, the bulges of the components of the metal plate positioned in the vibration direction of the protrusions are reduced. Consequently, the planar portion among protrusions easily contacts the surface of the metal plate. This allows maintaining the force caused by the vibration acting on the opposed surfaces of the metal plate with the metallic base material large.

In this bonding jig, the tapered surfaces on the base end sides of the protrusions may have a continuous curvature. According to this, by the tapered surfaces on the base end sides of the protrusions having the continuous curvature, while the distal ends of the protrusions bite into the metal plate, the components of the metal plate are easily pressed and expanded so as to be approximately uniform between the base end sides of the side surfaces positioned in the vibration direction of the protrusions and the metal plate. Consequently, the bulges of the metal plate components at the side surfaces positioned in the vibration direction of the protrusions can be restrained. This further ensures facilitating the contact of the planar portion among protrusions with the surface of the metal plate.

In this bonding jig, the protrusions may have side surfaces of tapered surfaces, the side surfaces being along the vibration direction. This configures the small distal ends of the protrusions, facilitating the biting of the protrusions into the metal plate. Furthermore, while the distal ends of the protrusions bite into the metal plate, the components of the metal plate can meander between the side surfaces along the vibration direction of the protrusions and the metal plate from between the side surfaces positioned in the vibration direction of the protrusions and the metal plate. Therefore, the bulges of the components of the metal plate can be restrained between the side surfaces positioned in the vibration direction of the protrusions and the metal plate.

In this bonding jig, the protrusions may have rectangular cross-sectional surfaces. According to this, the cross-sectional surface of the protrusion has the rectangular shape. Therefore, the vibration is likely to transmit to the metal plate by the side surfaces (for example, the two side surfaces) positioned in the vibration direction of the protrusions. Additionally, a volume of the recessed portions, which are formed on the metal plate by the biting by the protrusions, can be decreased by the side surfaces (for example, the two side surfaces) along the vibration direction of the protrusions.

In this bonding jig, the protrusions may have flat surfaces at the distal ends. According to this, the metal plate can be pressed by the planar portion among protrusions and the flat surfaces at the distal ends of the protrusions. Therefore, the pressing force can act on the metal plate to be approximately uniform.

In this bonding jig, the protrusions may have distal ends of the side surfaces positioned in the vibration direction, the distal ends being perpendicular to the vibration direction. According to this, the distal ends of the side surfaces positioned in the vibration direction of the protrusions become perpendicular to the vibration direction. Therefore, the vibration can be more likely to transmit to the metal plate by the side surfaces (for example, the two side surfaces) positioned in the vibration direction of the protrusions.

An ultrasonic bonding method according to one aspect of the present disclosure (the present ultrasonic bonding method) includes: stacking a base material and a metal plate that is thicker than a height of the protrusions of the ultrasonic bonding jig; pressing, with the ultrasonic bonding jig, the metal plate to the base material; and vibrating the ultrasonic bonding jig.

According to this bonding method, the distal ends of the protrusions do not penetrate the metal plate and contact the base material. This ensures maintaining strength of the metal plate during processing. Furthermore, the planar portion among protrusions formed among the base ends of the protrusions can be brought into contact with the surface of the metal plate. Therefore, the force caused by the pressing force and the vibration acts on the wide region of the metal plate. Accordingly, the metal plate and the base material can be excellently bonded together.

A bonding structure according to one aspect of the present disclosure (the present bonding structure) includes a bonding portion of a metal plate and a metallic base material, wherein the bonding portion has a recessed portion with a closed bottom on a surface of the metal plate, the recessed portion has opposed side surfaces of tapered surfaces, and at the tapered surfaces, an inclination of a tangent at an opening end of the recessed portion, with respect to the surface of a metal plate, is smaller than an inclination of a tangent at a bottom end of the recessed portion, with respect to the surface of the metal plate.

According to this bonding structure, the recessed portions with the closed bottoms do not penetrate the metal plate. This widens the bonded regions between the metal plate and the base material. Furthermore, the opposed side surfaces of the recessed portion have the tapered surfaces. Furthermore, the inclination of the tangent at the opening end of the recessed portion with respect to the surface of the metal plate is smaller than the inclination of the tangent at the bottom end of the recessed portion with respect to the surface of the metal plate. This decreases a volume occupied by the recessed portions. Consequently, the bonding strength between the metal plate and the base material can be enhanced.

In this bonding structure, the metal plate and the base material may be bonded together between the adjacent recessed portions. According to this, not only the recessed portions but also the metal plate and the base material are bonded together between the adjacent recessed portions.

This bonds the bonded regions (the bonding portion) of the metal plate with the base material to be approximately uniform. Therefore, the bonding strength of the metal plate with the base material can be further enhanced.

The following describes embodiments of the ultrasonic bonding jig, the ultrasonic bonding method, and the bonding structure according to the present disclosure.

[First Embodiment]

The following describes the ultrasonic bonding jig according to the first embodiment with reference to FIGS. 1 to 9C. The following defines the paper-surface-front side of FIG. 2A and the paper-surface-top side of FIG. 2B as the front surface side (the front side) of the ultrasonic bonding jig. Furthermore, the following defines the top, bottom, right, and left directions as the top, bottom, right, and left directions when the ultrasonic bonding jig is viewed from the front side in some cases.

As illustrated in FIG. 1, in the ultrasonic bonding, a metal foil 10 (a metal plate) as a laminated body made of gold, silver, copper, or the like is stacked on a metallic busbar 11 (a base material) and are placed on a support table 40. In this state, while the metal foil 10 is pressed by a head 1 (the ultrasonic bonding jig) mounted to an ultrasonic bonding machine, ultrasonic vibration (hereinafter sometimes simply referred to as "vibration") is performed on the head 1 at a predetermined frequency in a horizontal direction. Thus, pressing force and the ultrasonic vibration of the head 1 act on an opposed surface 10a of the metal foil 10 with the busbar 11 and an opposed surface 11a of the busbar 11 with the metal foil 10. Consequently, an oxide and other dirt on the metal surfaces are removed, and further friction heating generated by the pressing force and the ultrasonic vibration bond metal atoms together. Furthermore, the ultrasonic bonding machine used in the present embodiment is a general ultrasonic bonding machine referred to as the head 1 that linearly vibrates back and forth at a predetermined frequency in a horizontal direction. Accordingly, the following omits the detailed explanations and illustrations of a structure, a behavior, and the like of the ultrasonic bonding machine.

Figure 2A:
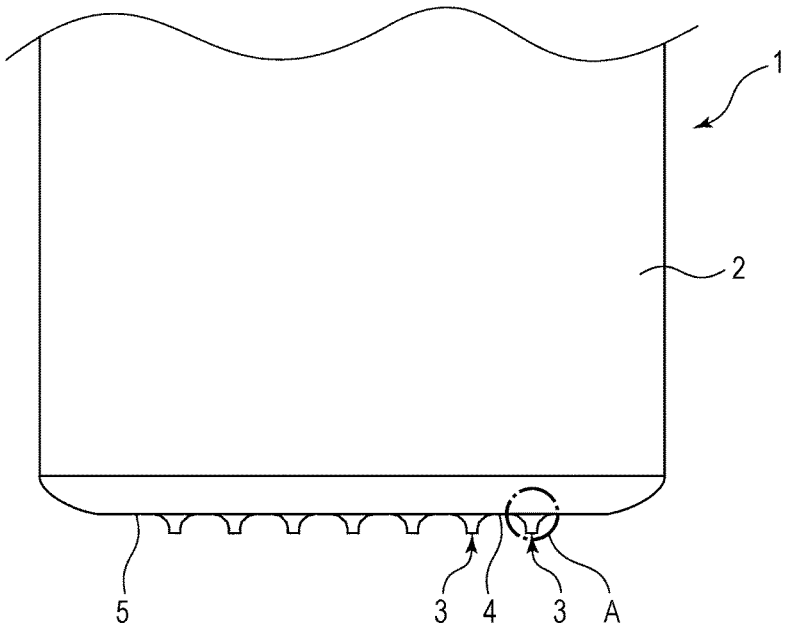
FIG. 2A is a side view illustrating a structure of a head as an ultrasonic bonding jig of the first embodiment.
Figure 2B:
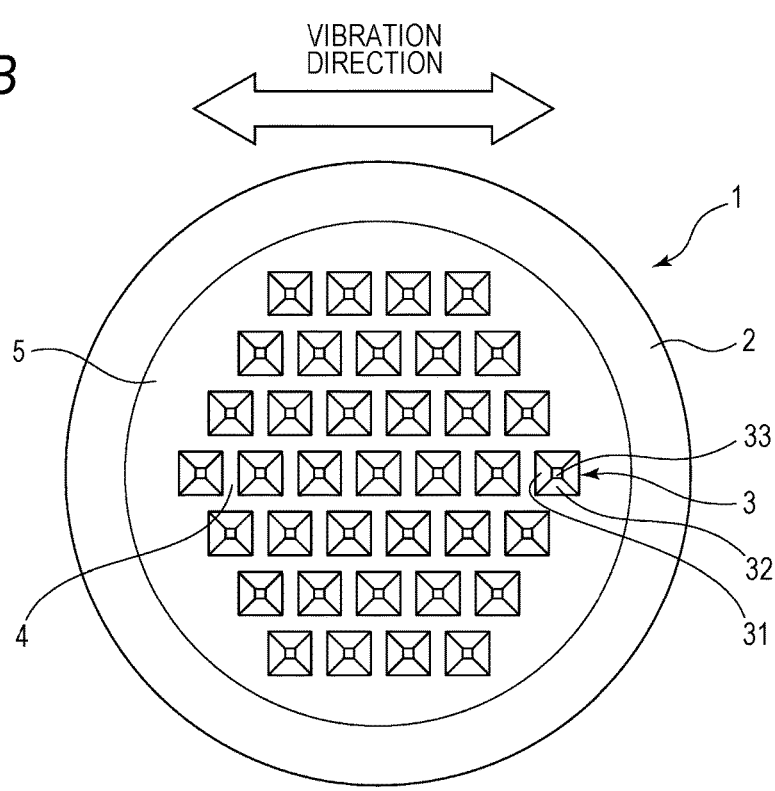
FIG. 2B is a plan view illustrating a structure of the head viewed from the below.

First, the following describes the structure of the head 1. As illustrated in FIGS. 2A and 2B, the head 1 is made of metal such as an aluminum alloy or a titanium alloy. The head 1 mainly includes a cylindrical-shaped body 2, a plurality of protrusions 3, and a planar portion among protrusions 4. The protrusions 3 project downward from a lower end surface of the body 2. The planar portion among protrusions 4 is formed among base ends of the adjacent protrusions 3. The plurality of protrusions 3 is arranged into a houndstooth pattern at an inner diameter side on the lower end surface of the body 2. FIG. 2A illustrates the protrusions 3 arranged at uniform intervals in a right-left direction. FIG. 2A schematically illustrates only the protrusions 3 (see FIG. 2B) arranged at an approximately center in the front-rear direction on the lower end surface of the body 2. The planar portion among protrusions 4 may have a width in a range of ½ times to double of a width of the protrusion 3 in the horizontal direction and preferably has a width in a range of ¾ to 5/4 times of the width of the protrusion 3 in the horizontal direction.

An annular planar portion 5 is formed at an outer diameter side on the lower end surface of the body 2. The protrusions 3 are not disposed across the whole circumference of the annular planar portion 5. The annular planar portion 5 is formed coplanar to the above-described planar portion among protrusions 4.

As illustrated in FIG. 2B, the protrusions 3 are arrayed in the right-left direction along the vibration direction of the head 1. The protrusion 3 has first walls 31 (tapered surfaces), second walls 32 (tapered surfaces), and a protrusion end surface 33. The first walls 31 constitute a pair of side surfaces extending in a direction approximately perpendicular to the vibration direction and arranged so as to be opposed to one another along the vibration direction. The first walls 31 are side surfaces of the protrusion 3 positioned in the vibration direction. The second walls 32 constitute a pair of side surfaces extending approximately parallel to (along the vibration direction) the vibration direction and arranged so as to be opposed to one another along the direction approximately perpendicular to the vibration direction. The second walls 32 are side surfaces of the protrusion 3, the side surfaces being positioned in a direction approximately perpendicular to the vibration direction. The protrusion end surface 33 is arranged at the distal end of the protrusion 3. The protrusion end surface 33 is constituted so as to be a flat surface approximately parallel to the lower end surface of the body 2.

Thus, the protrusion 3 has a truncated square pyramid shape including the first walls 31, the second walls 32, and the protrusion end surface 33. A cross-sectional surface of the protrusion 3 parallel to the lower end surface of the body 2 has a rectangular shape. The protrusion 3 has a height H configured to be smaller than a thickness T of the metal foil 10 (see FIG. 8A). The height H of the protrusion 3 may be in a range of 5 to 200 μm and is preferably in a range of 20 to 70 μm. The height H of the protrusion 3 may be in a range of ¼ to 9/10 times of the thickness T of the metal foil 10 and is preferably in a range of ⅓ to ⅘ times of the thickness T of the metal foil 10. Further, the first walls 31 and the second walls 32 of the protrusion 3 have an approximately identical configuration. Therefore, although the explanation is given on the first walls 31, the following omits the explanation of the second walls 32.

Figure 3:
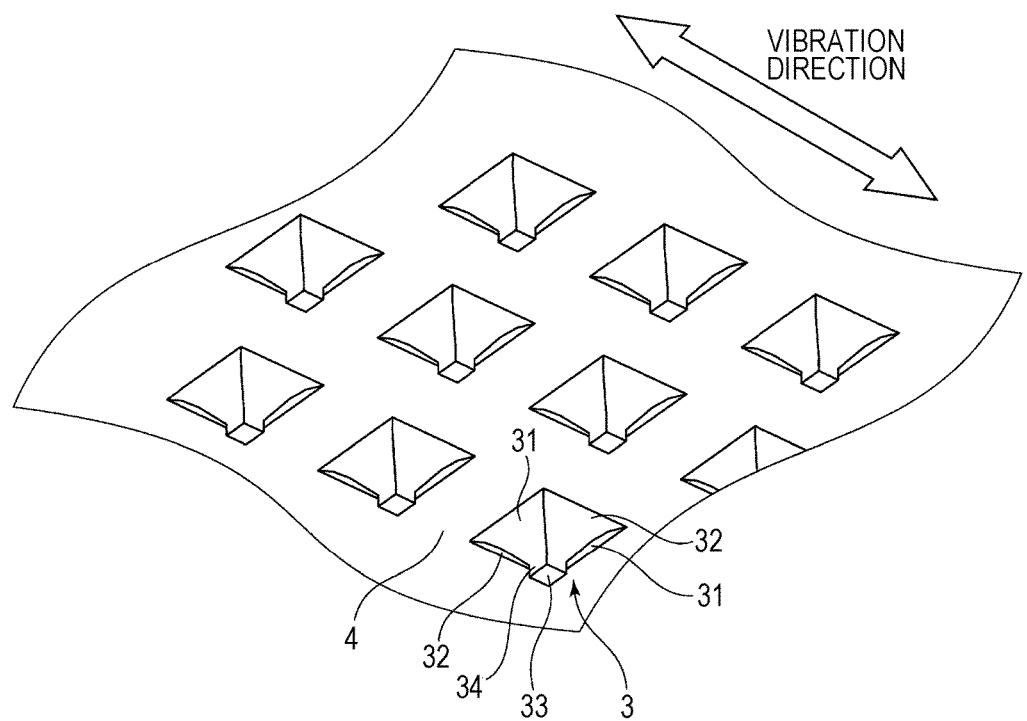
FIG. 3 is a perspective view illustrating a shape of protrusions formed on the head.
Figure 4:
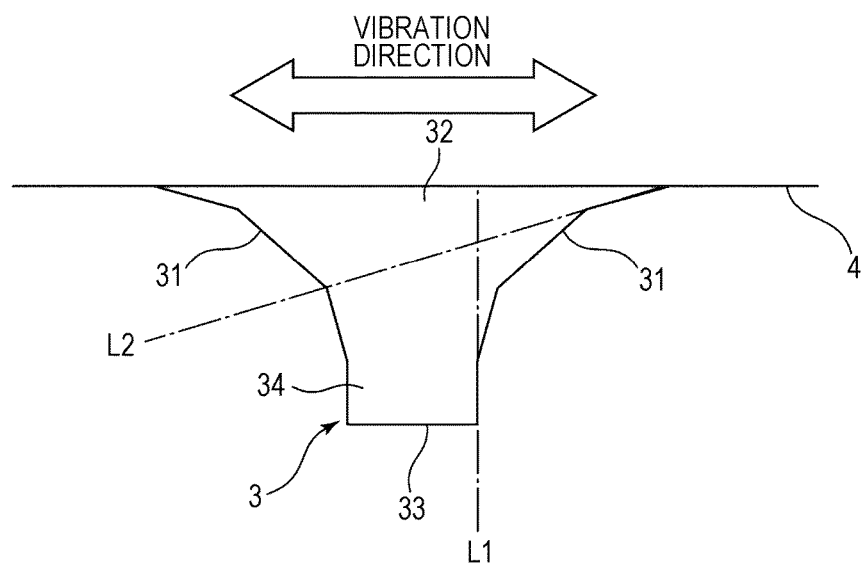
FIG. 4 is an enlarged view of a surrounded portion A in FIG. 2A and is a front view illustrating shapes of a first wall and a second wall of the protrusion.

As illustrated in FIGS. 2A and 3, the first wall 31 has a tapered shape tapered off toward the distal end (the lower side, the protrusion end surface 33) of the protrusion 3. As illustrated in FIG. 4, at the first wall 31, an inclination of a tangent L1 at the distal end (the protrusion end surface 33) of the protrusion 3 with respect to the vibration direction is larger than an inclination of a tangent L2 at the base end of the protrusion 3 with respect to the vibration direction. Note that the inclinations of the tangents L1 and L2 mean the inclinations of the tangents L1 and L2 with respect to the lower end surface (the planar portion among protrusions 4) of the body 2.

In other words, the first wall 31 has a shape recessed toward the inside of the protrusion 3, namely, a so-called inwardly protruding, recessed shape. The inclinations of the tangents L1 and L2 are absolute values of angles of the tangents L1 and L2 with respect to the lower end surface of the body 2. Furthermore, the first wall 31 has a perpendicular surface portion 34 formed approximately perpendicular to the vibration direction at the distal end side of the protrusion 3. The first wall 31 is constituted such that the inclination angle with respect to the vibration direction increases in stages from the perpendicular surface portion 34 to the base end. This inclination angle is an angle outside the protrusion 3 among the angles formed by the first wall 31 of the protrusion 3 and the lower end surface of the body 2. This forms the entire first wall 31 so as to have an approximately quadrant shape. Note that the above-described inclination angle of the first wall 31 with respect to the vibration direction may be an angle inside the protrusion 3 among the angles formed by the first wall 31 of the protrusion 3 and the lower end surface of the body 2. In this case, the inclination angle decreases in stages from a bottom end to the perpendicular surface portion 34.

Next, the following describes an ultrasonic bonding method that bonds the metal foil 10 and the busbar 11 together using the head 1. As illustrated in FIG. 5A, a load and the vibration are applied to the protrusions 3 while the protrusions 3 bit into the metal foil 10. Accordingly, the load and a force F1 caused by the vibration act, in the approximately vibration direction, on the metal foil 10 via the first walls 31, which are arranged so as to be opposed to one another along the vibration direction. Furthermore, the protrusion end surfaces 33 cause a pressing force F2 to act on the metal foil 10 approximately vertically. As illustrated in FIG. 5B, the second walls 32 are surfaces extending parallel to the vibration direction. Therefore, depending on the pair of second walls 32, which are disposed opposed to one another approximately perpendicular to the vibration direction, the above-described force F1 hardly acts on the metal foil 10. The pressing force F2 acts approximately vertically by the protrusion end surfaces 33. Thus, the protrusion end surfaces 33 of the protrusions 3 cause the pressing force F2 to act on the metal foil 10 approximately vertically. This ensures efficient transmission of the ultrasonic vibration to the metal foil 10. Accordingly, the oxide and other dirt on the metal surfaces of the metal foil 10 and the busbar 11 can be removed. Consequently, the bonding between the metal atoms can be easily performed.

Figure 6A:
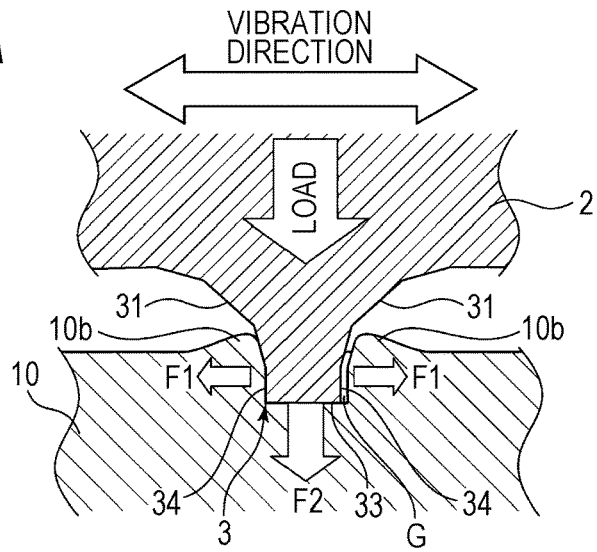
FIGS. 6A to 6C are front cross-sectional views illustrating a relationship between the first walls of the protrusion and bulges of metal foil components in the ultrasonic bonding according to the first embodiment.
Figure 6B:
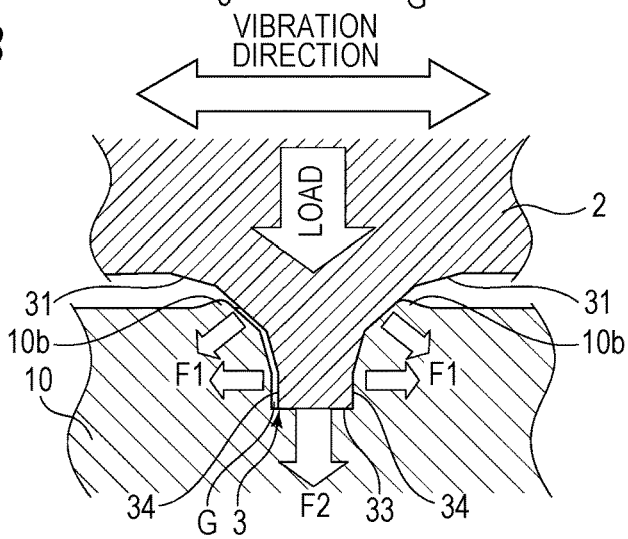
Figure 6C:
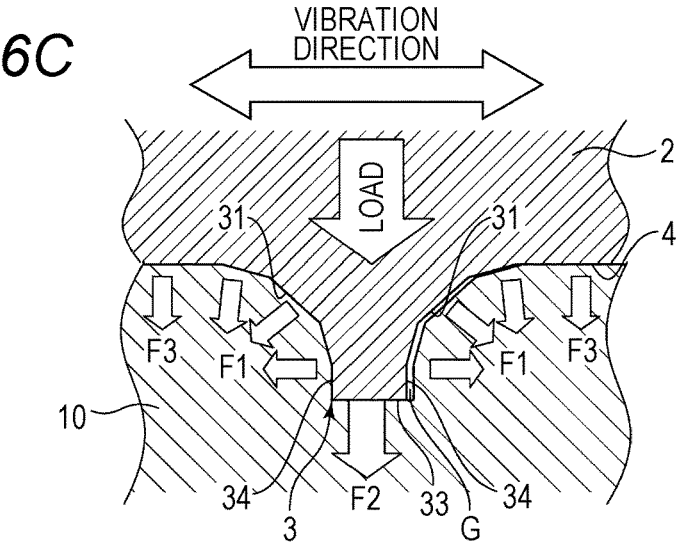

To bond the metal foil 10 and the busbar 11 together using the head 1, first, as illustrated in FIG. 6A, the protrusions 3 are set in the state of biting into the metal foil 10. In this state, the force F1 acts on the metal foil 10 in the approximately vibration direction by the first walls 31, which are disposed opposed to one another along the vibration direction. Consequently, components of the metal foil 10 are pressed up (the base end side of the protrusions 3) along the first walls 31. Thus, bulges 10b are formed on the metal foil 10. Here, in the first walls 31, the perpendicular surface portions 34 on the distal end side of the protrusion 3 are formed approximately perpendicular to the vibration direction. Therefore, the force acting such that the components of the metal foil 10 are pressed up by the first walls 31 can be restrained while the protrusions 3 bite into the metal foil 10. A fine clearance G illustrated in FIGS. 6A to 6C is formed between the first wall 31 and the surface of the metal foil 10 by the vibration of the protrusions 3 when the protrusions 3 bite into the metal foil 10. Additionally, the force F1 does not actually act on between the second walls 32, which constitute the side surfaces disposed opposed to one another approximately perpendicular to the vibration direction, and the surface of the metal foil 10. Therefore, the bulges 10b of the components of the metal foil 10 and the fine clearance G are not formed at this part or are formed but small to be negligible (see FIGS. 7A to 7C).

Next, as illustrated in FIG. 6B, when the protrusions 3 further bite into the metal foil 10, the bulges 10b of the components of the metal foil 10 abut on the first walls 31, which are configured such that the inclination angle with respect to the vibration direction increases in stages from the perpendicular surface portions 34 on the distal end side of the protrusion 3 to the base end. That is, the components of the metal foil 10 are pressed and expanded to the surface of the metal foil 10 along the first walls 31 (see FIG. 6B). That is, as the protrusions 3 bite into the metal foil 10, the bulges 10b of the components of the metal foil 10 can be gradually decreased. Accordingly, the planar portion among protrusions 4 can abut on the surface of the metal foil 10 while the protrusions 3 bite into the metal foil 10 without a hindrance from the bulges 10b of the components of the metal foil 10 (see FIG. 6C).

As illustrated in FIGS. 6A to 6C, the first walls 31 are configured such that the inclination angle with respect to the vibration direction increases in stages from the perpendicular surface portions 34 at the distal end side of the protrusion 3 to the base end. Accordingly, as the protrusions 3 bite into the metal foil 10, the direction that the force F1 caused by the load and the vibration act on the metal foil 10 can head not only for the approximately vibration direction but also approximately vertically. This ensures causing both the force F1 by the first walls 31 and the pressing force F2 by the protrusion end surfaces 33 to act on the metal foil 10 approximately vertically. Additionally, the first walls 31 (and the second walls 32) of the protrusion 3 are configured such that the inclination angle with respect to the vibration direction increases in stages from the perpendicular surface portions 34 at the distal end side to the base end. This facilitates the biting of the protrusions 3 into the metal foil 10 in a process of transitioning from the state illustrated in FIG. 6A to the state illustrated in FIG. 6C.

Figure 7A:
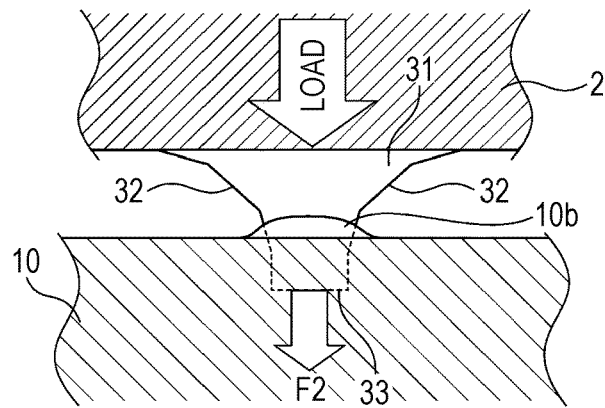
FIGS. 7A to 7C are partial side cross-sectional views illustrating a relationship between the first walls of the protrusion and the bulges of the metal foil components in the ultrasonic bonding according to the first embodiment, and are cross-sectional side views cut out along a position of a planar portion among protrusions.
Figure 7B:
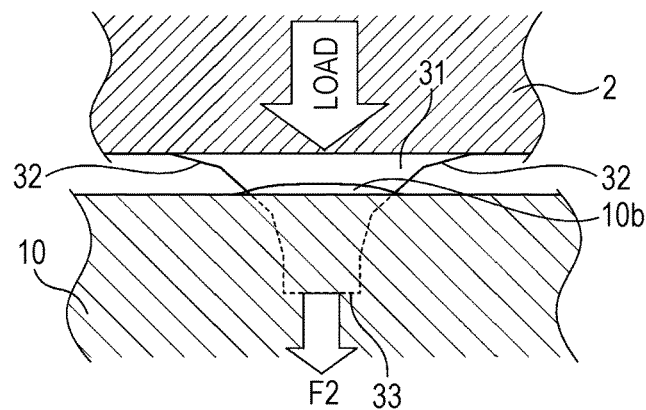
Figure 7C:
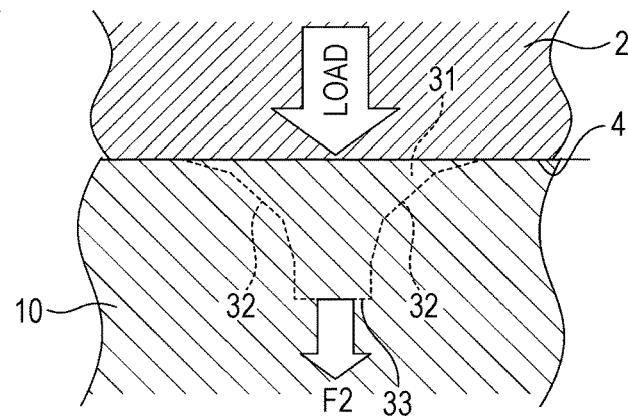

As illustrated in FIG. 7A, while the protrusions 3 bite into the metal foil 10, as described above, the components of the metal foil 10 are pressed up along the first walls 31 and the bulges 10b are formed on the metal foil 10. Here, the first walls 31 have the tapered shape tapered off toward the distal end (the lower side). Accordingly, as illustrated in FIG. 7B, when the protrusions 3 further bite into the metal foil 10, the components of the metal foil 10 pressed up along the parts on the distal end side of the first walls 31 with the small size can be pressed and expanded to the surface of the metal foil 10 along the parts on the base end side of the first walls 31 with the large area. That is, as the protrusions 3 bite into the metal foil 10, the bulges 10b of the components of the metal foil 10 can be effectively decreased. Accordingly, the planar portion among protrusions 4 can abut on the surface of the metal foil 10 while the protrusions 3 bite into the metal foil 10 without the hindrance from the bulges 10b of the components of the metal foil 10 (see FIG. 7C).

Here, the following describes, in detail, the state in which the protrusions 3 bite into the metal foil 10 up to a desired depth with reference to FIG. 6C illustrating this state. In the state where the planar portion among protrusions 4 abuts on the surface of the metal foil 10, the perpendicular surface portions 34 of the protrusions 3 are arranged approximately perpendicular to the vibration direction on the distal end side of the first walls 31. Therefore, the force F1 mainly acts in the vibration direction. Consequently, the components of the metal foil 10 are less likely to be pressed up. The inclination with respect to the vibration direction decreases on the base end side of the first walls 31 such that the base end sides of the first walls 31 are continuous with the planar portion among protrusions 4. Therefore, the force F1 mainly acts approximately vertically in cooperation with a pressing force F3 by the planar portion among protrusions 4. Consequently, the force F3 and the force F1 press and expand the bulges 10b of the components of the metal foil 10 by pressing the bulges 10b downward.

Figure 8A:
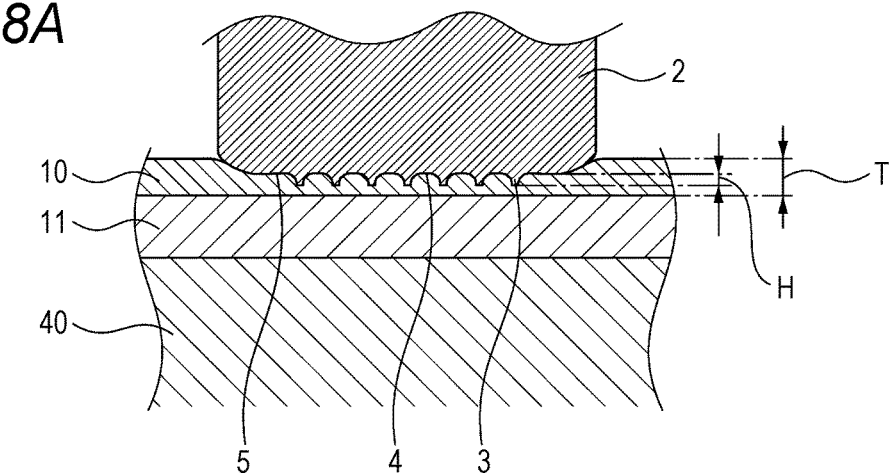
FIG. 8A is a front cross-sectional view illustrating a state of the ultrasonic bonding of the metal foil with the busbar according to the first embodiment.

As illustrated in FIG. 8A, the height H of the protrusion 3 is configured to be smaller than the thickness T of the metal foil 10. Therefore, the protrusion 3 does not penetrate the metal foil 10. Accordingly, while the protrusions 3 bite into the metal foil 10, the surface of the metal foil 10 can be pressed by the planar portion among protrusions 4 and the annular planar portion 5. Thus, using the wide range of the lower end surface of the body 2 of the head 1, the pressing force and the ultrasonic vibration can be transmitted to the metal foil 10 and the busbar 11.

According to the present embodiment, the head 1 vibrates while pressing the metal foil 10 having the thickness T larger than the height H of the protrusion 3. Therefore, the distal ends of the protrusions 3 do not penetrate the metal foil 10 and contact the busbar 11. This ensures maintaining strength of the metal foil 10 during processing. Furthermore, at the first wall 31, the inclination of the tangent L1 with respect to the vibration direction is large at the distal end of the protrusion 3. Therefore, while the distal ends of the protrusions 3 bite into the metal foil 10, an amount that the distal end sides of the first walls 31 positioned in the vibration direction of the protrusions 3 press up the components of the metal foil 10 can be reduced. Furthermore, at the first wall 31, the inclination of the tangent L2 with respect to the vibration direction is small at the base end of the protrusion 3. Therefore, the base end sides of the first walls 31 positioned in the vibration direction of the protrusions 3 press down the components of the metal foil 10 to press and expand the components. Accordingly, the bulges 10b of the components of the metal foil 10 positioned in the vibration direction of the protrusions 3 are reduced. Consequently, the planar portion among protrusions 4 easily abuts on the surface of the metal foil 10 without the hindrance from the bulges 10b of the components of the metal foil 10. This allows maintaining the force caused by the vibration acting on the opposed surfaces 10a and 11a of the metal foil 10 with the busbar 11 large. Consequently, the force caused by the pressing force and the vibration can efficiently act on the metal foil 10, thereby ensuring excellent bonding of the metal foil 10 with the busbar 11.

The second walls 32 of the protrusions 3 along the vibration direction of the protrusions 3 have the tapered shape similar to the first walls 31. This leads to the small distal ends of the protrusions 3, facilitating the biting of the protrusions 3 into the metal foil 10. Furthermore, while the distal ends of the protrusions 3 bite into the metal foil 10, the components of the metal foil 10 can meander between the second walls 32 along the vibration direction of the protrusions 3 and the metal foil 10 from between the first walls 31 positioned in the vibration direction of the protrusions 3 and the metal foil 10. Therefore, the amount of the components of the metal foil 10 abutting on the base end sides of the first walls 31 can be reduced. Consequently, the bulges 10b of the components of the metal foil 10 formed along the first walls 31 can be restrained.

The cross-sectional surface of the protrusion 3 has the rectangular shape. Therefore, the vibration is likely to transmit to the metal foil 10 by the first walls 31 positioned in the vibration direction of the protrusions 3. Additionally, a volume of recessed portions 13 described later, which are formed on the metal foil 10 by the biting by the protrusions 3, can be decreased by the second walls 32 along the vibration direction of the protrusions 3.

The protrusion end surface 33 at the distal end of the protrusion 3 is configured so as to be the flat surface approximately parallel to the lower end surface of the body 2. Therefore, the metal foil 10 can be pressed by the planar portion among protrusions 4 and the protrusion end surfaces 33 at the distal ends of the protrusions 3. Therefore, the pressing force can act on the metal foil 10 to be approximately uniform.

The protrusion 3 includes the perpendicular surface portions 34 on the distal end sides of the first walls 31. Accordingly, the distal ends of the first walls 31 positioned in the vibration direction become approximately perpendicular to the vibration direction. Therefore, the vibration can be more likely to transmit to the metal foil 10 by the first walls 31 positioned in the vibration direction of the protrusions 3.

Figure 8B:
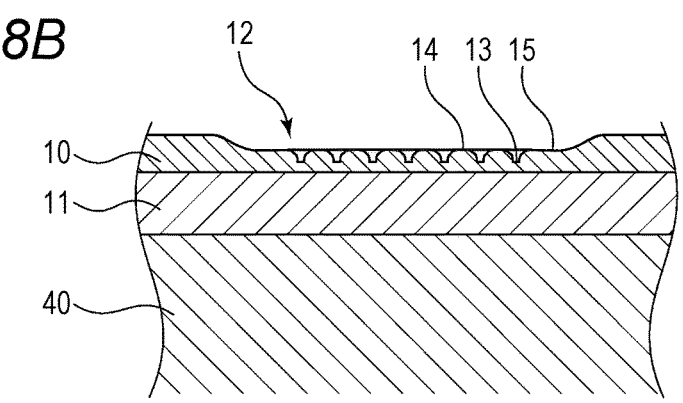
FIG. 8B is a front cross-sectional view illustrating a structure of a bonding portion after the ultrasonic bonding.
Figure 8C:
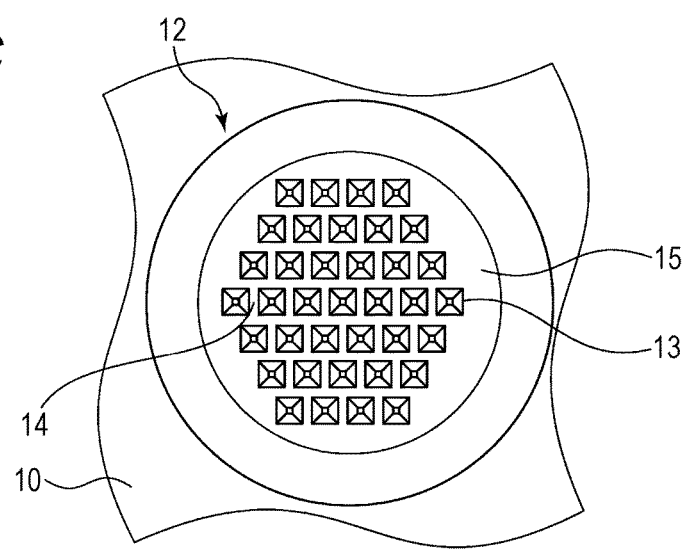
FIG. 8C is a plan view illustrating the structure of the bonding portion after the ultrasonic bonding viewed from the above.

Next, the following describes the bonding structure of the metal foil 10 with the busbar 11 formed by ultrasonic bonding using the head 1. As illustrated in FIGS. 8B and 8C, a circular bonding portion 12, which slightly sinks, is formed on the surface of the metal foil 10 pressed by the head 1. The bonding portion 12 includes the plurality of recessed portions 13 with closed bottoms, a flat portion among recessed portions 14, which is formed among the adjacent recessed portions 13, and an annular flat portion 15. The annular flat portion 15 is a part where the recessed portions 13 are not formed and formed across the whole circumference on the outer diameter side of the recessed portions 13.

Figure 9A:
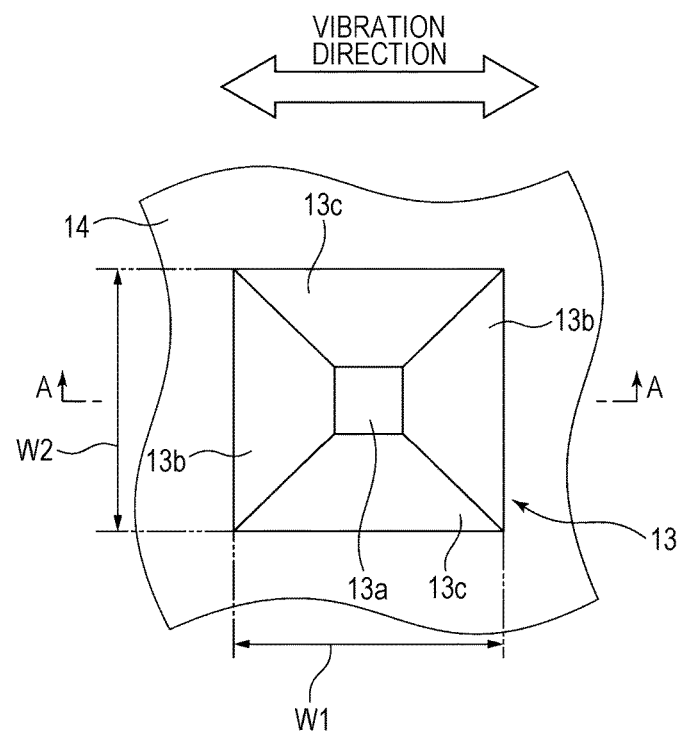
FIG. 9A is a plan view illustrating a structure of a recessed portion formed at a surface of the metal foil by the ultrasonic bonding according to the first embodiment viewed from the above.

As illustrated in FIG. 9A, the recessed portion 13 has a rectangular bottom surface 13a, a pair of first side surfaces 13b, and a pair of second side surfaces 13c. The pair of first side surfaces 13b is opposed to one another along the vibration direction. The pair of second side surfaces 13c is opposed to one another along a direction approximately perpendicular to the vibration direction. A width dimension W1 of the second side surface 13c is slightly larger than a width dimension W2 of the first side surface 13b by the amount of the width dimension of the above-described fine clearance G. As described above, the fine clearance G is formed between the first walls 31 and the surface of the metal foil 10 by the vibration of the protrusions 3.

Figure 9B:
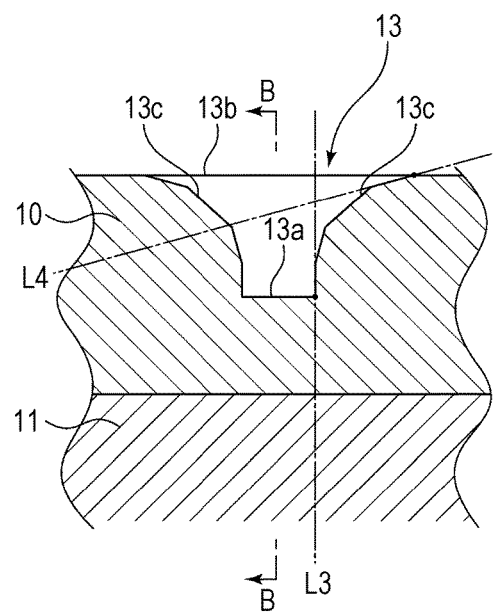
FIG. 9B is a front cross-sectional view of the recessed portion taken along an A-A cross-sectional surface in FIG. 9A.
Figure 9C:
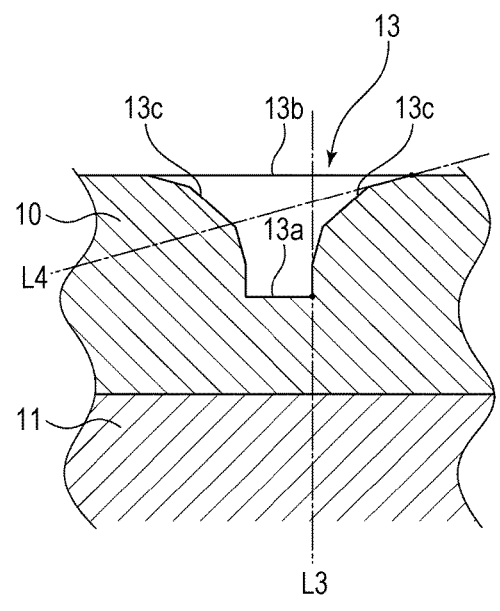
FIG. 9C is a cross-sectional side view of the recessed portion taken along a B-B cross-sectional surface in FIG. 9B.

As illustrated in FIGS. 9B and 9C, the first side surfaces 13b and the second side surfaces 13c have a tapered shape tapered off toward a bottom surface 13a (the lower side). At the first side surface 13b and the second side surface 13c, an inclination of a tangent L4 at an opening end of the recessed portion 13 with respect to the surface of the metal foil 10 is smaller than an inclination of a tangent L3 at the bottom end of the recessed portion 13 with respect to the surface of the metal foil 10. The inclinations of the tangents L3 and L4 mean the inclinations of the tangents L3 and L4 with respect to the surface of the metal foil 10 (the flat portion among recessed portions 14). Furthermore, the bottom end side of the recessed portion 13 at the first side surfaces 13b and the second side surfaces 13c is formed approximately perpendicular to the surface of the metal foil 10. Furthermore, the first side surface 13b and the second side surface 13c are configured such that the inclination angles with respect to the surface of the metal foil 10 increase in stages for the opening end from the bottom end of the recessed portion 13. This inclination angle is an angle outside the recessed portion 13 among the angles formed by the first side surface 13b and the second side surface 13c of the recessed portion 13 with the surface of the metal foil 10. Accordingly, the entire first side surface 13b and second side surface 13c form an approximately quadrant shape. The above-described inclination angles of the first side surface 13b and the second side surface 13c with respect to the surface of the metal foil 10 may be an angle inside the recessed portion 13 among the angles formed by the first side surface 13b and the second side surface 13c of the recessed portion 13 with the surface of the metal foil 10. In this case, the inclination angle decreases in stages from the bottom end to the opening end of the recessed portion 13.

According to the present embodiment, the recessed portions 13 with the closed bottoms do not penetrate the metal foil 10. This widens the bonded regions between the metal foil 10 and the busbar 11. Furthermore, the pair of first side surfaces 13b opposed to one another and the pair of second side surfaces 13c opposed to one another of the recessed portion 13 have the tapered shape. Furthermore, at the first side surface 13b and the second side surface 13c, the inclination of the tangent L4 at the opening end of the recessed portion 13 with respect to the surface of the metal foil 10 is smaller than the inclination of the tangent L3 at the bottom end of the recessed portion 13 with respect to the surface of the metal foil 10. This decreases a volume of the bonding portion 12 occupied by the recessed portions 13. Consequently, the bonding strength between the metal foil 10 and the busbar 11 can be enhanced.

The metal foil 10 and the busbar 11 are bonded together between the adjacent recessed portions 13, that is, the flat portion among recessed portions 14 formed pressed by the planar portion among protrusions 4 of the head 1 and the annular flat portion 15 formed pressed by the annular planar portion 5 of the head 1. Therefore, the bonded regions between the metal foil 10 and the busbar 11 are approximately uniformly bonded together on the bonding portion 12. Consequently, the bonding strength between the metal foil 10 and the busbar 11 can be further enhanced.

[Second Embodiment]

Figure 10A:
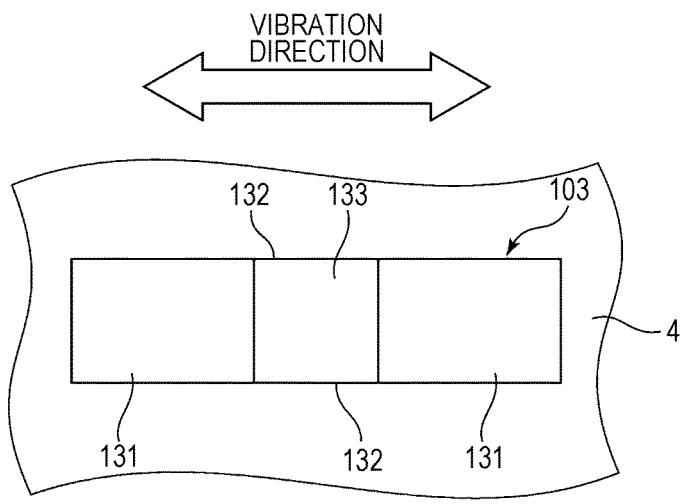
FIG. 10A is a plan view illustrating a shape of a protrusion according to a second embodiment of the present disclosure.
Figure 10B:
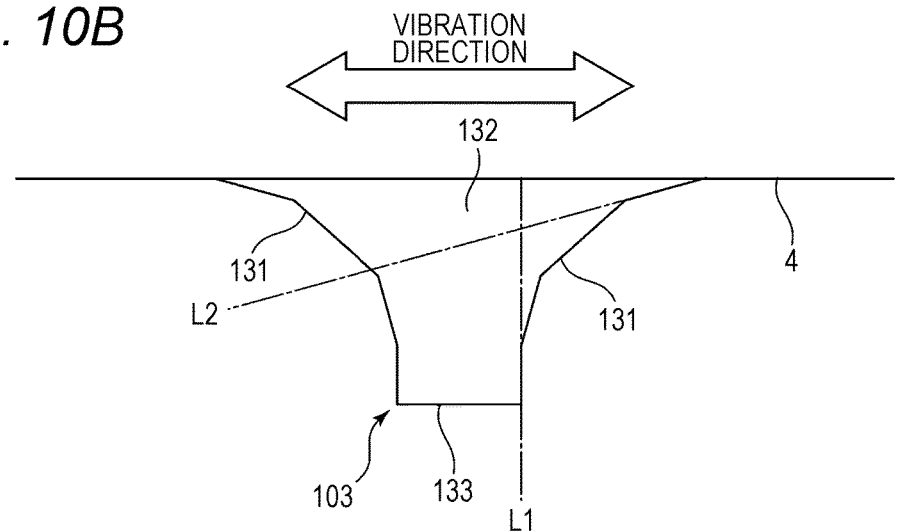
FIG. 10B is a front view illustrating shapes of a first wall and a second wall of the protrusion.
Figure 10C:
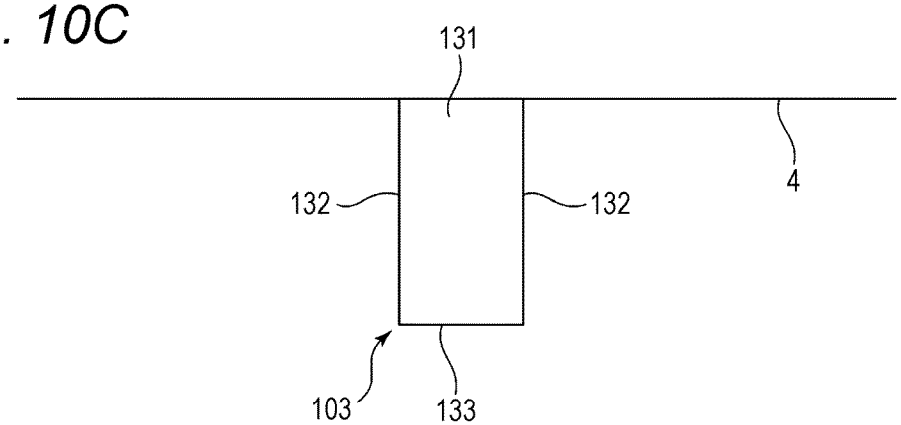
FIG. 10C is similarly a side view.

Next, the following describes an ultrasonic bonding jig according to the second embodiment with reference to FIGS. 10A to 10C. Like reference numerals designate identical elements throughout the embodiments, and therefore such elements will not be further elaborated here.

As illustrated in FIG. 10A, a head (the ultrasonic bonding jig) according to the second embodiment includes protrusions 103 instead of the protrusions 3 in the head 1 described in the first embodiment. As illustrated in FIG. 10A, the protrusion 103 has first walls 131 (tapered surfaces), second walls 132, and a protrusion end surface 133. The first walls 131 constitute a pair of side surfaces arranged so as to be opposed to one another along the vibration direction. The first walls 131 are side surfaces of the protrusion 103 positioned in the vibration direction. The second walls 132 constitute a pair of side surfaces extending approximately parallel to the vibration direction and arranged so as to be opposed to one another along the direction approximately perpendicular to the vibration direction. The second walls 132 are side surfaces of the protrusion 103, the side surfaces being positioned in a direction approximately perpendicular to the vibration direction. The protrusion end surface 133 is arranged at the distal end of the protrusion 103. The protrusion end surface 133 is constituted so as to be a flat surface approximately parallel to the lower end surface of the body 2.

Thus, the protrusion 103 has a trapezoidal plate shape including the first walls 131, the second walls 132, and the protrusion end surface 133. A cross-sectional surface of the protrusion end surface 133 parallel to the lower end surface of the body 2 has a rectangular shape. As illustrated in FIG. 10C, the first wall 131 has a rectangular shape viewed from the vibration direction. Further, as illustrated in FIG. 10B, the first wall 131 has a tapered shape tapered off toward the distal end (the lower side) of the protrusion 103 viewed from the direction perpendicular to the vibration direction. The second wall 132 is a surface having an approximately trapezoidal shape viewed from the direction perpendicular to the vibration direction and configured as a surface approximately perpendicular to the lower end surface (the planar portion among protrusions 4) of the body 2.

As illustrated in FIG. 10B, at the first wall 131, an inclination of the tangent L1 at the distal end of the protrusion 103 with respect to the vibration direction is larger than an inclination of the tangent L2 at the base end of the protrusion 103 with respect to the vibration direction. The inclinations of the tangents L1 and L2 mean the inclinations of the tangents L1 and L2 with respect to the lower end surface (the planar portion among protrusions 4) of the body 2. Furthermore, at the first walls 131, the distal end side of the protrusion 103 is formed approximately perpendicular to the vibration direction. Furthermore, the first wall 131 is configured such that the inclination angle with respect to the vibration direction increases in stages for the base end from the distal end of the protrusion 3. This inclination angle is an angle outside the protrusion 103 among the angles formed by the first walls 131 of the protrusion 103 with the lower end surface of the body 2. This forms the entire first wall 131 so as to have an approximately quadrant shape. The above-described inclination angle of the first wall 131 with respect to the vibration direction may be an angle inside the protrusion 103 among the angles formed by the first wall 131 of the protrusion 103 and the lower end surface of the body 2. In this case, the inclination angle decreases in stages from the distal end to the base end of the protrusion 3.

According to the present embodiment, the head 1 vibrates while pressing the metal foil 10 having the thickness T larger than the height H of the protrusion 103. Furthermore, at the first wall 131, the inclination of the tangent L1 with respect to the vibration direction is large at the distal end of the protrusion 103. Therefore, while the distal ends of the protrusions 103 bite into the metal foil 10, an amount that the distal end sides of the first walls 131 positioned in the vibration direction of the protrusions 103 press up the components of the metal foil 10 can be reduced. Furthermore, at the first wall 131, the inclination of the tangent L2 with respect to the vibration direction is small at the base end of the protrusion 103. Therefore, the base end sides of the first walls 131 positioned in the vibration direction of the protrusions 103 press down the components of the metal foil 10 to press and expand the components. Accordingly, the bulges 10b of the components of the metal foil 10 positioned in the vibration direction of the protrusions 103 are reduced. Consequently, the planar portion among protrusions 4 easily abuts on the surface of the metal foil 10 without the hindrance from the bulges 10b of the components of the metal foil 10. This allows maintaining the force caused by the vibration acting on the opposed surfaces 10a and 11a of the metal foil 10 with the busbar 11 large. Consequently, the force caused by the pressing force and the vibration can efficiently act on the metal foil 10, thereby ensuring excellent bonding of the metal foil 10 with the busbar 11.

As illustrated in FIGS. 10A and 10C, a thickness of the protrusion 103 in a front-rear direction is approximately uniform from the distal end to the base end. Therefore, the strength of the protrusion 103 can be enhanced.

[Third Embodiment]

Figure 11A:
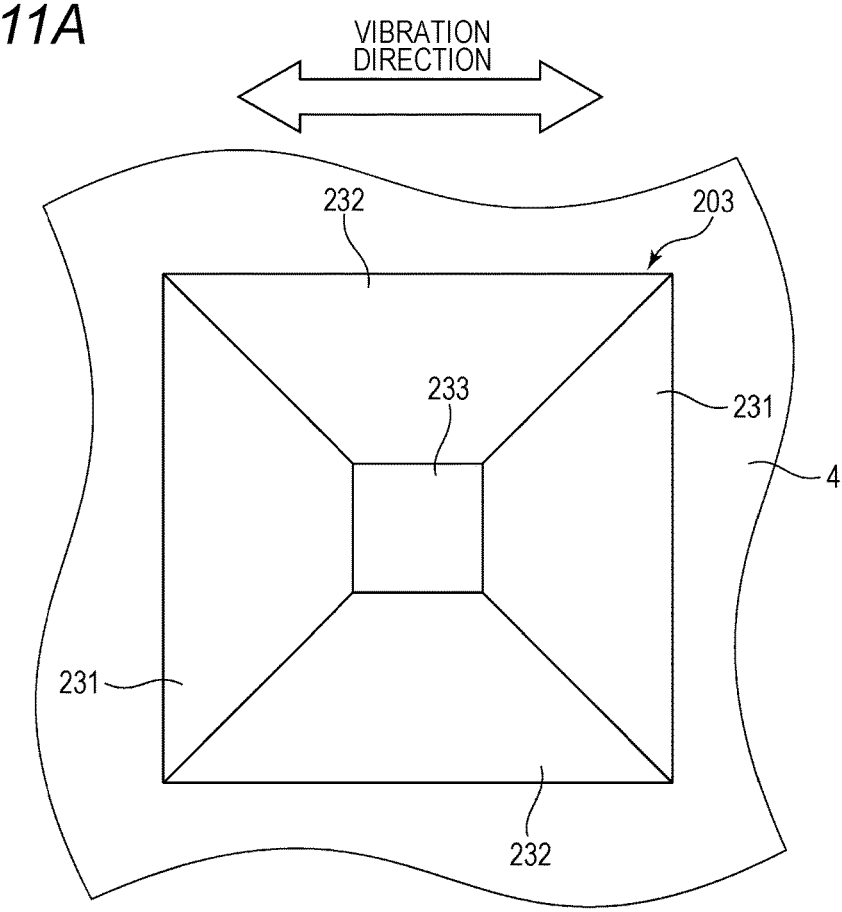
FIG. 11A is a plan view illustrating a shape of a protrusion according to a third embodiment of the present disclosure.
Figure 11B:
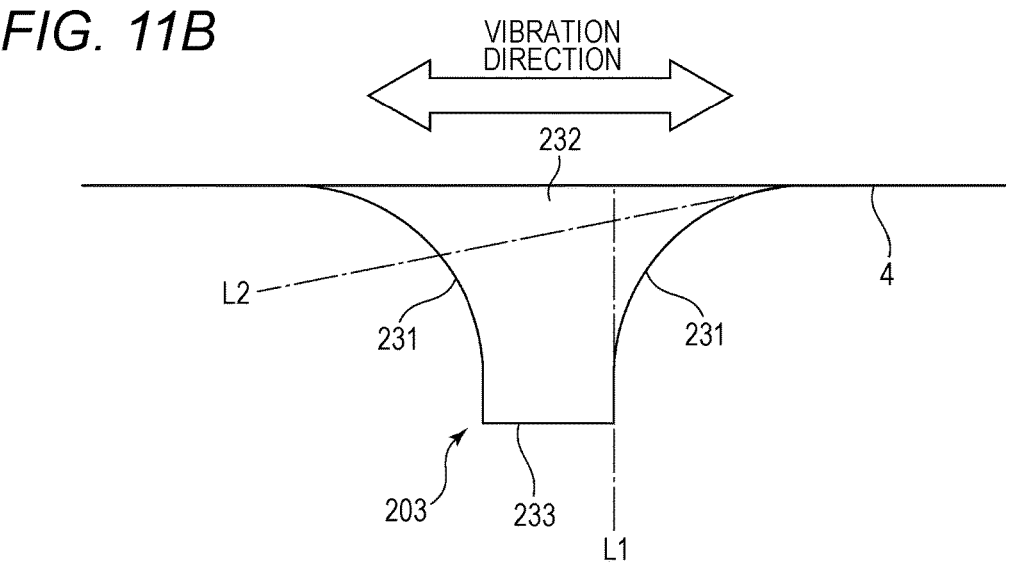
FIG. 11B is a front view illustrating shapes of a first wall and a second wall of the protrusion.

Next, the following describes an ultrasonic bonding jig according to the third embodiment with reference to FIGS. 11A and 11B. Like reference numerals designate identical elements throughout the embodiments, and therefore such elements will not be further elaborated here.

As illustrated in FIGS. 11A and 11B, a head (the ultrasonic bonding jig) according to the third embodiment includes protrusions 203 instead of the protrusions 3 in the head 1 described in the first embodiment. As illustrated in FIGS. 11A and 11B, the protrusion 203 has first walls 231 (tapered surfaces), second walls 232 (tapered surfaces), and a protrusion end surface 233. The first walls 231 constitute a pair of side surfaces extending in a direction approximately perpendicular to the vibration direction and arranged so as to be opposed to one another along the vibration direction. The first walls 231 are side surfaces of the protrusion 203 positioned in the vibration direction. The second walls 232 constitute a pair of side surfaces extending approximately parallel to the vibration direction and arranged so as to be opposed to one another along the direction approximately perpendicular to the vibration direction. The second walls 232 are side surfaces of the protrusion 203, the side surfaces being positioned in a direction approximately perpendicular to the vibration direction. The protrusion end surface 233 is arranged at the distal end of the protrusion 203. The protrusion end surface 233 is constituted so as to be a flat surface approximately parallel to the lower end surface of the body 2. Thus, the protrusion 203 has a truncated square pyramid shape including the first walls 231, the second walls 232, and the protrusion end surface 233. A cross-sectional surface of the protrusion 203 parallel to the lower end surface of the body 2 has a rectangular shape. Note that the first walls 231 and the second walls 232 of the protrusion 203 have a configuration approximately identical to one another. Therefore, although the explanation is given on the first walls 231, the following omits the explanation of the second walls 232.

As illustrated in FIG. 11B, the first wall 231 has a tapered shape tapered off toward the distal end (the lower side, the protrusion end surface 233) of the protrusion 203. At the first wall 231, an inclination of the tangent L1 at the distal end of the protrusion 203 with respect to the vibration direction is larger than an inclination of the tangent L2 at the base end of the protrusion 203 with respect to the vibration direction. Note that the inclinations of the tangents L1 and L2 mean the inclinations of the tangents L1 and L2 with respect to the lower end surface (the planar portion among protrusions 4) of the body 2.

Furthermore, at the first wall 231, the distal end side of the protrusion 203 is formed so as to be approximately perpendicular to the vibration direction. Furthermore, the first wall 231 has a quadrant shape. This quadrant shape has a continuous curvature such that the inclination angle with respect to the vibration direction gradually increases from the distal end to the base end of the protrusion 203. This inclination angle is an angle outside the protrusion 203 among the angles formed by the first walls 231 of the protrusion 203 with the lower end surface of the body 2. Note that the above-described inclination angle of the first wall 231 with respect to the vibration direction may be an angle inside the protrusion 203 among the angles formed by the first wall 231 of the protrusion 203 and the lower end surface of the body 2. In this case, the inclination angle decreases in stages from the distal end to the base end of the protrusion 203.

According to the present embodiment, the head 1 vibrates while pressing the metal foil 10 having the thickness T larger than the height H of the protrusion 203. Furthermore, at the first wall 231, the inclination of the tangent L1 with respect to the vibration direction is large at the distal end of the protrusion 203. Therefore, while the distal ends of the protrusions 203 bite into the metal foil 10, an amount that the distal end sides of the first walls 231 positioned in the vibration direction of the protrusions 203 press up the components of the metal foil 10 can be reduced. Furthermore, at the first wall 231, the inclination of the tangent L2 with respect to the vibration direction is small at the base end of the protrusion 203. Hence, the base end sides of the first walls 231 positioned in the vibration direction of the protrusions 203 press down the components of the metal foil 10 to press and expand the components. Accordingly, the bulges 10b of the components of the metal foil 10 positioned in the vibration direction of the protrusions 203 are reduced. Consequently, the planar portion among protrusions 4 easily abuts on the surface of the metal foil 10 without the hindrance from the bulges 10b of the components of the metal foil 10. This allows maintaining the force caused by the vibration acting on the opposed surfaces 10a and 11a of the metal foil 10 with the busbar 11 large. Consequently, the force caused by the pressing force and the vibration can efficiently act on the metal foil 10, thereby ensuring excellent bonding of the metal foil 10 with the busbar 11.

At the first wall 231, at least the base end side of the protrusion 203 has a continuous curvature. Therefore, while the distal ends of the protrusions 203 bite into the metal foil 10, the components of the metal foil 10 are easily pressed and expanded so as to be approximately uniform between the base end sides of the first walls 231 positioned in the vibration direction of the protrusion 203 and the metal foil 10. Consequently, the bulges 10b of the components of the metal foil 10 along the first walls 231 can be restrained. This further ensures facilitating the contact of the planar portion among protrusions 4 with the surface of the metal foil 10.

In the above, the embodiments of the present disclosure have been described with the drawings. The specific configuration of the technique in the present disclosure is not limited to these embodiments. The above-described embodiments may be changed, and other configurations or steps may be added to the above-described embodiments, in a range without departing from the gist of the present disclosure.

For example, with the embodiments, the shape of the body 2 of the head 1 is not limited to be the cylindrical shape and may be freely configured according to the shape of the base material on which the ultrasonic bonding is performed with the metal foil. The base material on which the ultrasonic bonding is performed with the metal foil is not limited to the busbar and may be freely selected, for example, may be various terminals or a cable.

With the embodiments, the height H of the protrusions 3, 103, and 203 is configured to be smaller than the thickness T of the metal foil 10. The configuration is not limited to this. As long as the planar portion among protrusions and the annular planar portion at the lower end surface of the head can abut on the surface of the metal foil and the protrusions 3, 103, and 203 do not penetrate the metal foil, the height H of the protrusions 3, 103, and 203 may be approximately identical to the thickness of the metal foil.

Additionally, the plurality of protrusions 3, 103, and 203 are arranged in the houndstooth pattern. Instead of this, the plurality of protrusions 3, 103, and 203 may be arranged into a grid pattern.

With the embodiments, the cross-sectional surfaces of the protrusions 3, 103, and 203 parallel to the lower end surface of the body 2 have the rectangular shape. Instead of this, the above-described cross-sectional surfaces of the protrusions 3, 103, and 203 may have an arc shape.

The protrusions 3 may be configured as follows. The protrusions 3 are aligned in the right-left direction along the vibration direction of the head 1. The protrusion 3 has the truncated square pyramid shape by the first walls 31 (the tapered surfaces), which constitute the side surfaces disposed opposed to one another so as to be approximately perpendicular to the vibration direction (positioned in the vibration direction), the second walls 32 (the tapered surfaces), which constitute the side surfaces disposed opposed to one another so as to be approximately parallel to the vibration direction (along the vibration direction), and the protrusion end surface 33, which is disposed at the distal end of the protrusion 3 configured so as to be the flat surface approximately parallel to the lower end surface of the body 2. The cross-sectional shape taken parallel to the lower end surface of the body 2 has a rectangular cross-sectional surface.

The recessed portion 13 may be constituted of the rectangular bottom surface 13a, the first side surfaces 13b, which are opposed to one another so as to be approximately perpendicular to the vibration direction, and the second side surfaces 13c, which are opposed to one another so as to be approximately parallel to the vibration direction.

The protrusion 103 may be configured as follows. The protrusion 103 has the trapezoidal plate shape by the first walls 131 (the tapered surfaces), which constitute the side surfaces disposed opposed to one another so as to be approximately perpendicular to the vibration direction, the second walls 132, which constitute the side surfaces disposed opposed to one another so as to be approximately parallel to the vibration direction and parallel to one another, and the protrusion end surface 133, which is disposed at the distal end of the protrusion 103 configured so as to be the flat surface approximately parallel to the lower end surface of the body 2. The cross-sectional shape taken parallel to the lower end surface of the body 2 has a rectangular cross-sectional surface.

The protrusions 203 may be configured as follows. The protrusions 203 has the truncated square pyramid shape by the first walls 231 (the tapered surfaces), which constitute the side surfaces disposed opposed to one another so as to be approximately perpendicular to the vibration direction, the second walls 232 (the tapered surfaces), which constitute the side surfaces disposed opposed to one another so as to be approximately parallel to the vibration direction, and the protrusion end surface 233, which is disposed at the distal end of the protrusion 203 configured so as to be the flat surface approximately parallel to the lower end surface of the body 2. The cross-sectional shape taken parallel to the lower end surface of the body 2 has a rectangular cross-sectional surface.

The embodiments of the present disclosure may also be the following first to sixth ultrasonic bonding jigs, first ultrasonic bonding method, and first and second bonding structures.

The first ultrasonic bonding jig is an ultrasonic bonding jig that has a plurality of protrusions. The ultrasonic bonding jig vibrates a planar portion among protrusions formed among base ends of the protrusions while pressing the planar portion among protrusions to a metal plate so as to bond the metal plate and a metallic base material together. The protrusions at least have side surfaces of tapered surfaces, the side surfaces being positioned in a vibration direction. At the tapered surfaces, an inclination of a tangent at distal ends of the protrusions with respect to the vibration direction of the protrusions is larger than an inclination of a tangent at the base ends of the protrusions with respect to the vibration direction of the protrusions.

In the second ultrasonic bonding jig according to the first ultrasonic bonding jig, the tapered surfaces on the base end sides of the protrusions at least have a continuous curvature.

In the third ultrasonic bonding jig according to the first or the second ultrasonic bonding jig, the protrusions have side surfaces of tapered surfaces, the side surfaces being along the vibration direction.

In the fourth ultrasonic bonding jig according to any one of the first to the third ultrasonic bonding jigs, the protrusions have rectangular cross-sectional surfaces.

In the fifth ultrasonic bonding jig according to any one of the first to the fourth ultrasonic bonding jigs, the protrusions have flat surfaces at the distal ends.

In the sixth ultrasonic bonding jig according to any one of the first to the fifth ultrasonic bonding jigs, the protrusions have distal ends of the side surfaces positioned in the vibration direction, the distal ends being perpendicular to the vibration direction.

The first ultrasonic bonding method is an ultrasonic bonding method that bonds a metal plate and a metallic base material together using an ultrasonic bonding jig. The ultrasonic bonding jig has a plurality of protrusions and a planar portion among protrusions formed among base ends of the plurality of protrusions. The protrusions at least have side surfaces of tapered surfaces, the side surfaces being positioned in a vibration direction. At the tapered surfaces, an inclination of a tangent at distal ends of the protrusions with respect to the vibration direction of the protrusions is larger than an inclination of a tangent at the base ends of the protrusions with respect to the vibration direction of the protrusions. The ultrasonic bonding method vibrates the ultrasonic bonding jig while pressing the ultrasonic bonding jig to the metal plate thicker than a height of the protrusions.

The first bonding structure is formed by bonding of a metal plate with a metallic base material. A recessed portion with a closed bottom shape is formed on a surface of the metal plate. The recessed portion has opposed side surfaces with a tapered surface shape. At the tapered surfaces, an inclination of a tangent at an opening end of the recessed portion with respect to a surface of the metal plate is smaller than an inclination of a tangent at a bottom end of the recessed portion with respect to the surface of the metal plate.

In the second bonding structure according to the first bonding structure, the metal plate and the base material are bonded together between the adjacent recessed portions.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An ultrasonic bonding jig comprising:
   a plurality of protrusions; and
   a planar portion arranged among the plurality of protrusions at base ends of the plurality of protrusions, wherein
   the planar portion has a flat surface that covers a continuous area between the base ends of the protrusions,
   the plurality of protrusions have side surfaces that are tapered, at least one of the side surfaces being aligned in a direction orthogonal to a direction in which another of the side surfaces is aligned,
   an inclination of a tangent of the side surface directly adjacent to a distal end of each of the plurality of protrusions, with respect to the planar portion, is larger than an inclination of a tangent of the side surface directly adjacent to the base end of each of the plurality of protrusions, with respect to the planar portion, the inclination varying in uncurved stages between the distal end and the planar portion of each of the plurality of protrusions, and the side surfaces directly adjacent to the distal end of each of the plurality of protrusions are aligned perpendicular with respect to the planar portion.

2. The ultrasonic bonding jig according to claim 1, wherein the side surfaces of the plurality of protrusions have rectangular cross-sections.

3. The ultrasonic bonding jig according to claim 1, wherein the distal ends of the plurality of protrusions are flat.

* * * * *